United States Patent [19]

Erskine et al.

[11] 4,150,290

[45] Apr. 17, 1979

[54] FOCAL-SURFACE DETECTOR FOR HEAVY IONS

[75] Inventors: John R. Erskine, Downers Grove; Thomas H. Braid, La Grange Park, both of Ill.; Joseph C. Stoltzfus, Beloit, Wis.

[73] Assignee: The United States of America as represented by the United States Department of Energy, Washington, D.C.

[21] Appl. No.: 796,626

[22] Filed: May 13, 1977

[51] Int. Cl.² .............................................. B01D 59/44
[52] U.S. Cl. ...................................... 250/283; 250/385
[58] Field of Search ........................ 250/385, 397, 283

[56] References Cited

U.S. PATENT DOCUMENTS

| 2,741,709 | 4/1956 | Tirico et al. | 250/385 |
| 3,927,324 | 12/1975 | Fletcher | 250/385 |

Primary Examiner—Harold A. Dixon
Attorney, Agent, or Firm—Dean E. Carlson; Frank H. Jackson; Donald P. Reynolds

[57] ABSTRACT

A detector of the properties of individual charged particles in a beam includes a gridded ionization chamber, a cathode, a plurality of resistive-wire proportional counters, a plurality of anode sections, and means for controlling the composition and pressure of gas in the chamber. Signals generated in response to the passage of charged particles can be processed to identify the energy of the particles, their loss of energy per unit distance in an absorber, and their angle of incidence. In conjunction with a magnetic spectrograph, the signals can be used to identify particles and their state of charge. The detector is especially useful for analyzing beams of heavy ions, defined as ions of atomic mass greater than 10 atomic mass units.

7 Claims, 13 Drawing Figures

FOCAL-SURFACE DETECTOR FOR HEAVY IONS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an apparatus for detection of the properties of individual ions.

Detectors of charged particles have been produced for years in many forms to detect various properties of charged particles. One particular type of interest is a detector for placement at the focal surface of a magnetic spectrograph. The magnetic spectrograph bends the paths of moving charged particles in a magnetic field so that the product of the magnetic flux density and the radius of curvature of the path of a charged particle is proportional to the momentum of the particle. All particles are focused on a focal surface, and the position along the focal surface provides a measure of the momentum of a moving particle. If one additional property such as the energy or velocity can be deduced by a detector, it is possible to identify the mass of the particle and hence what the particle is. The selectivity of such a detector becomes particularly important when heavy ions (defined as those greater than 10 atomic mass units) are studied because the percent differences between isotopes of adjacent mass numbers become smaller as the mass increases. One instrument designed for such measurements is the position-sensitive double proportional counter which measures the position of a particle along the focal surface, the energies of a number of particles and the final energy of the particle. Another instrument useful for such measurements is the so-called delta E-E time-of-flight telescope, which measures the product of energy loss (delta E) and energy (E). Other instruments are known that are useful for measuring properties of charged particles but that are of less direct use in application to a magnetic spectrograph. All of the instruments that have been known previously are inadequate for measuring properties of heavy ions at the focal surface of a magnetic spectrograph. Some do not provide adequate resolution of the energies of particles. Others do not provide means of measuring the angle of incidence of a particle. They do not provide for a multiple measurement of the energy change as the particle is stopped.

It is an object of the present invention to provide a better focal-surface detector of charged particles.

It is a further object of the present invention to provide a detector for placement at the focal surface of a magnetic spectrograph.

It is a further object of the present invention to provide a focal-surface detector for heavy ions having having improved discrimination between particles.

It is a further object of the present invention to provide a detector of charged particles that is sensitive to the position of the charged particles in a focal surface.

Other objects will become apparent in the course of a detailed description of the invention.

SUMMARY OF THE INVENTION

A detector of properties of ions comprises a combination of a gridded ionization chamber, a pair of resistive-wire proportional counters, a drift chamber, and an electronic circuit for processing signals received by the counters, the ionization chamber, and the drift chamber to identify the type of charged particles, their numbers, their energies, and their angles of incidence.

DETAILED DESCRIPTION OF THE INVENTION

Figure 1:
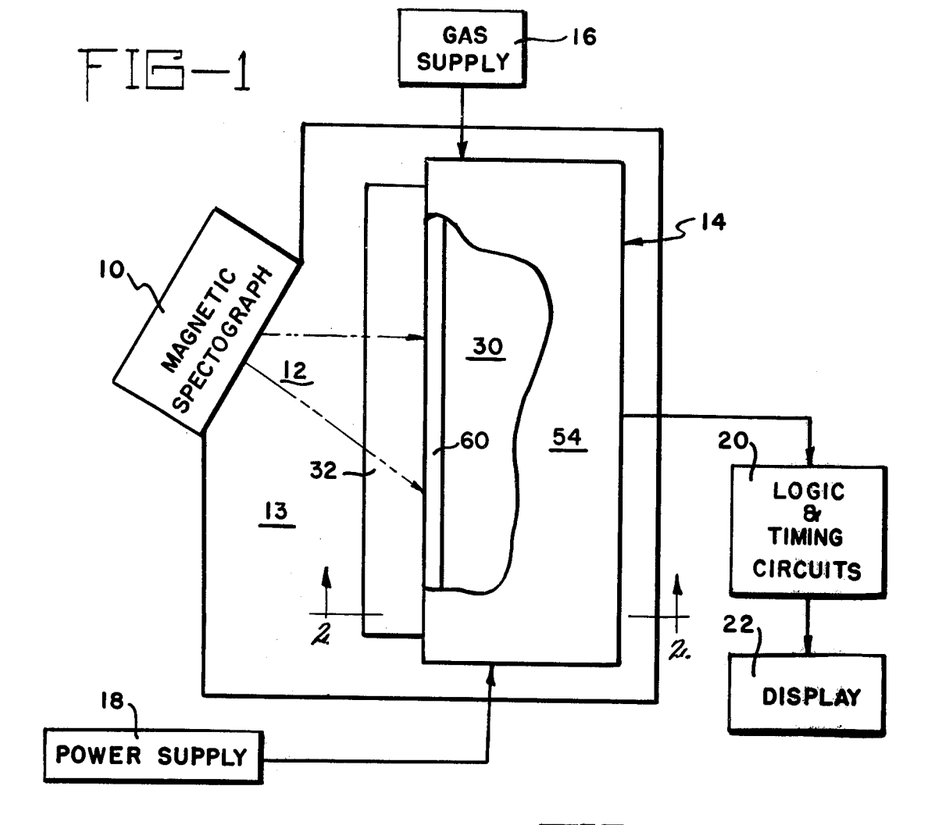
FIG. 1 is an overall block diagram of an apparatus for the practice of the present invention.

FIG. 1 is an overall block diagram of an apparatus for the practice of the present invention. In FIG. 1, a magnetic spectrograph 10 produces as an output a stream of ions in a region 12. These are in the vacuum region 13 of the spectrograph 10. Ions in region 12 have velocities and directions that are functions of the particular ion, its charge state, its mass and the energy associated with it. The stream of ions is directed at detector 14 which is adapted to measure properties of the ions. Detector 14 is connected to a gas supply 16 to supply a colliding medium of known properties for the ions from spectrograph 10. A power supply 18 is connected to detector 14 to supply operating electrical voltages and currents. The output of detector 14, consisting of electrical signals, is connected to a set of logic and timing circuits 20 for signal processing. The processed signals are then connected to display 22 to provide usable information about the ions from magnetic spectrograph 10.

Figure 2:
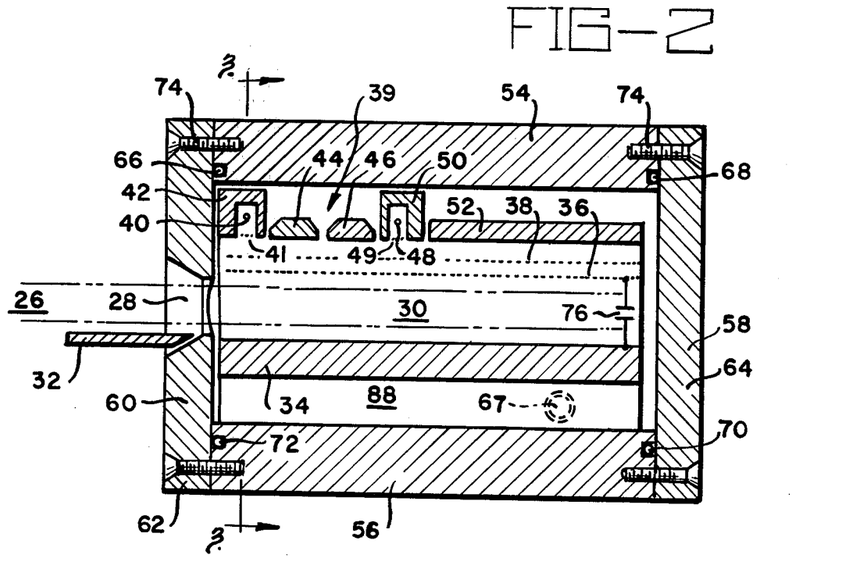
FIG. 2 is a sectional end view of the detector of FIG. 1 taken along section lines 2—2 of FIG. 1.
Figure 3:
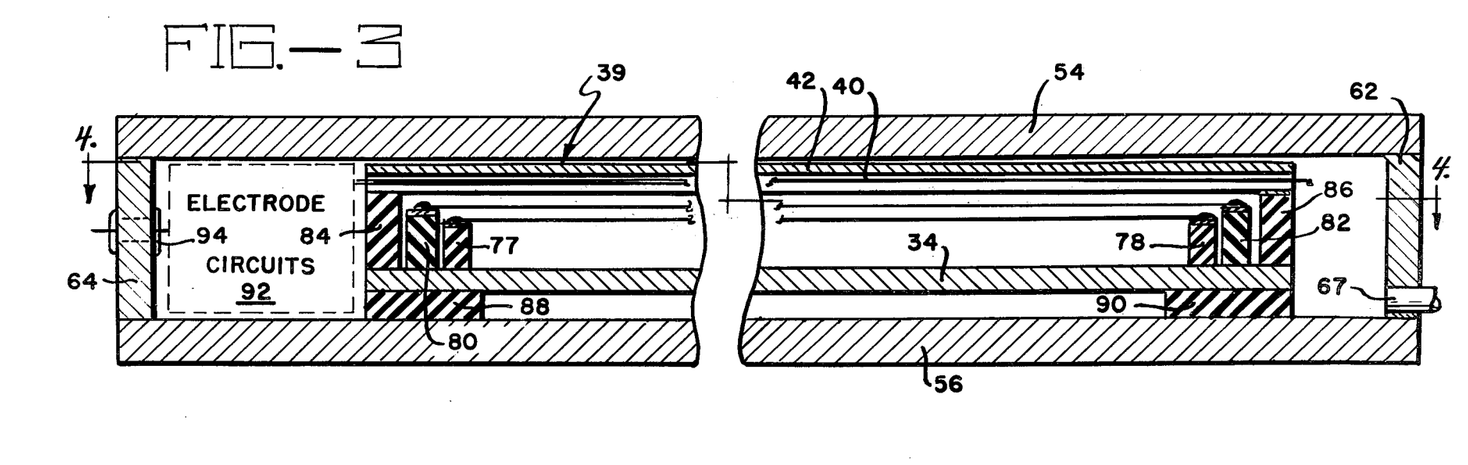
FIG. 3 is a partial sectional front view of the detector of FIG. 1 along section lines 3—3 of FIG. 2.
Figure 4:
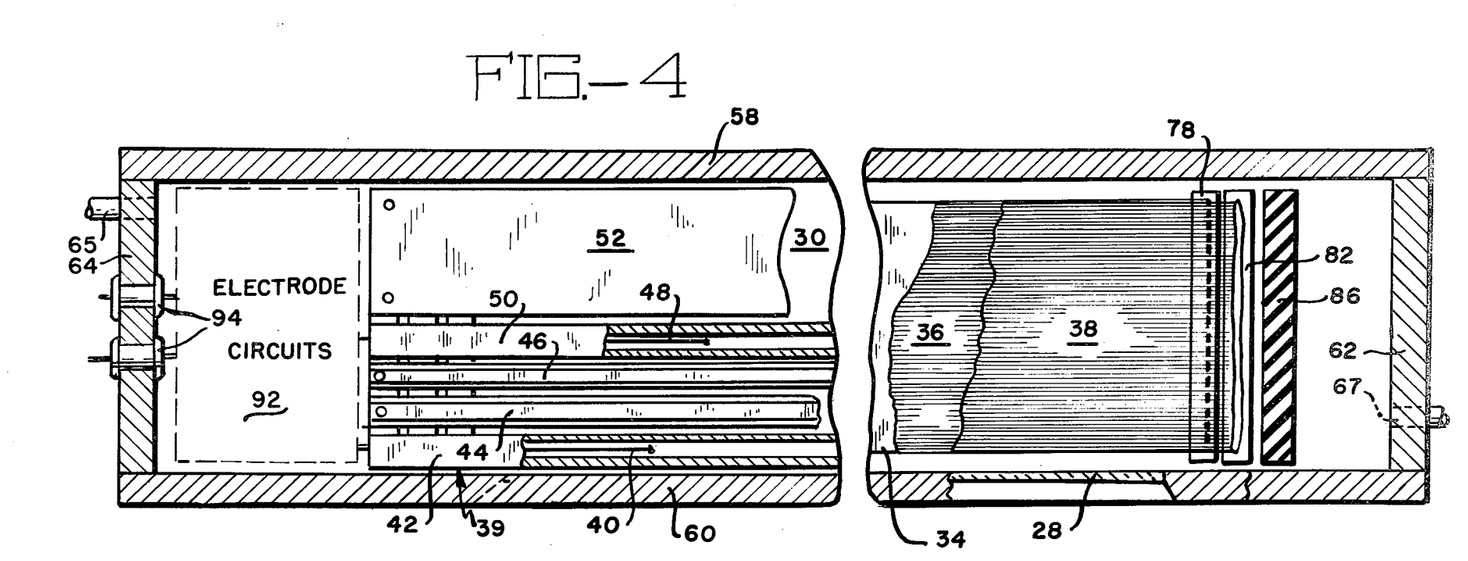
FIG. 4 is a sectional top view of the detector of FIG. 1 along section lines 4—4 of FIG. 3.

Further understanding of the invention may be had from FIGS. 2, 3, and 4. FIG. 2 is a cross-sectional end view of detector 14 of FIG. 1 taken along section lines 2—2. FIG. 3 is a partial sectional front view of the detector with emphasis on the ends, taken along section lines 3—3 of FIG. 2. FIG. 4 is a multiple sectional top view along section lines 4—4 of FIG. 3. In FIGS. 2, 3, and 4, a stream 26 of ions is incident on detector 14. The ions in stream 26 pass from vacuum region 13 through window 28 of a material such as Mylar, a trade name for a polyester film. Window 28 is selected to offer neglible opposition to the ions in stream 26 while containing a gas in the interior 30 of detector 14. Stream 26 first passes parallel to a guard electrode 32, a field-shaping structure that is maintained at a predetermined voltage with respect to the remainder of the outside of detector 14, which is at electrical ground. After passing through window 28, the stream 26 passes parallel to cathode 34, an electrically conducting structure that is maintained at a predetermined voltage with respect to ground, and also parallel to a pair of wire grids 36 and 38. Grid 36, the one closer to stream 26, is maintained at a fixed d-c voltage with respect to electrical ground, here, zero. Grid 38 is caused to have a predetermined voltage that is in general different from the voltage of grid 36. Arrayed above grid 38 is a sequence of field-shaping and detecting elements. These are referred to collectively as split anode 39 which includes the following elements: first position wire 40 that is largely enclosed in first shield grid 41 and first shield 42, first collector 44, second collector 46, second position wire 48, largely enclosed within second shield grid 49 and second shield 50, and field shaper 52, extending beyond second shield 50. First shield 42, first collector 44, second collector 46, second shield 50 and field shaper 52 are all made of aluminum or the like, and shield grids 41 and 49 are each four wires of beryllium-copper, 75 micrometers in diameter. These elements are maintained at the same d-c electrical voltage with respect to ground and are disposed to form an essentially planar equipotential surface above and parallel to grid 38. Position wires 40 and 48 are in general biased to a voltage different from that of the elements of split anode 39. Cathode 34, grids 36 and 38 and split anode 39 are all in a gaseous environment that is contained by top 54, bottom 56, both of which are connected to back 58 and front 60. A port 65 admits a gas to the interior 30 of detector 10. It may be desirable to place a second port 67 to permit the gas to flow through the interior 30. Gaskets 66, 68, 70 and 72 are of a flexible material that is compressed upon assembly of the detector to maintain a seal against leakage of gas. Screws 74 are placed to hold the top 54, bottom 56, back 58, and front 60 together in a rigid assembly.

Ions in stream 26 are brought from a magnetic spectrograph and are caused to be focused under first position wire 40. The stream 46 is typically directed at an angle of the order of 45 degrees with respect to position wire 40. This angle is stated approximately because the trajectories of ions in stream 26 are a function of the mass and energy of each particular particle and measurements of the exact angles of trajectories of different particles provides the identifying information for which detector 14 is designed. This can be seen by referring to FIG. 2 and noting that the path of an ion into the interior 30 of detector 14 will cause the ion to collide with molecules of the gas that is inside detector 14. Each such colllision that ionizes a gas atom will produce electrons and gas ions that will drift under the influence of electric fields and that will provide information upon collection. As an ion in stream 26 proceeds through interior 30 and collides with gas molecules, the ion loses energy until it is eventually stopped before reaching back 58 of detector 14. The particular gas, its pressure and the depth of detector 14 are all chosen to be sure that essentially all of the ions in stream 26 are stopped by such collisions. Electrons released by collisions, typically millions for each ion in stream 26, are repelled by a negative potential on cathode 34 and are thus directed upward, while gas ions that are produced are relatively immobile. Essentially all the electrons will pass through grid 36 and they will generate a detectable pulse by induction on passing the plane of grid 36. This pulse is normally coupled by capacitor 76 to cathode 34 to add to the pulse obtained thereon by induction. It is also possible to disconnect capacitor 76 from cathode 34 and use the signals from grid 36 and cathode 34 separately. This will be described later in detail.

Grid 38 serves further to accelerate electrons vertically in the direction of split anode 39, and to shield anode 39 from electrons below grid 38. Electrons generated by a particular ion in stream 26 will intercept the collecting elements of split anode 39, generating a pulse at each of the associated elements as they are collected from directly below the element. Thus, first position wire 40 collects electrons from below it to produce a pulse that gives the position of the beam along first position wire 40. First collector 44 receives electrons directed vertically from a portion of stream 26 that is directly below first collector 44. First collector 44 provides information on the loss of energy of the ions in stream 26 as a result of collisions with gas in the interior 30 of detector 14. Another such signal is generated by the impact of electrons on second collector 46 from ions in stream 26 directly below second collector 46 that have been slowed still further on the average by collisions with gas. Second position wire 48 collects electrons from a position directly below it to provide a signal that will be used in conjunction with signals from first position wire 40 in a way that will be demonstrated later. Field shaper 52 collects essentially the balance of electrons resulting from collisions. The current to field shaper 52 and that to first shield 42 and second shield 52 are not normally monitored because they provide no information that does not duplicate other information that is available. The use of that available information will be described after a final look at the structural layout.

FIGS. 3 and 4 show grid 36 which is supported and insulated by supports 77 and 78 made of a material such as Delrin, a trade name for an acetal resin. Supports 80 and 82 similarly hold and insulate grid 38 and supports 84 and 86 similarly support and insulate split anode 39. All these supports are typically of Delrin or the like, as are spacers 88 and 90 which support the detector above and insulate it from bottom 56. Grids 36 and 38 are typically made of beryllium-copper wire, of the order of 125 micrometers in diameter. Electronic circuits 92 are shown in symbolic form in their location within the structure described above and feed-throughs 94 bring out electrical signals from electronic circuits 92 for further processing. Additional electronic circuitry may be placed at the opposite end, outside support 66. Details of electronic circuits 92 will be indicated with reference to later figures. The purpose of FIG. 4 is to show the structural arrangement of the detector and those components that are conveniently placed within the detector to locate them close to the various detector elements.

Figure 5:
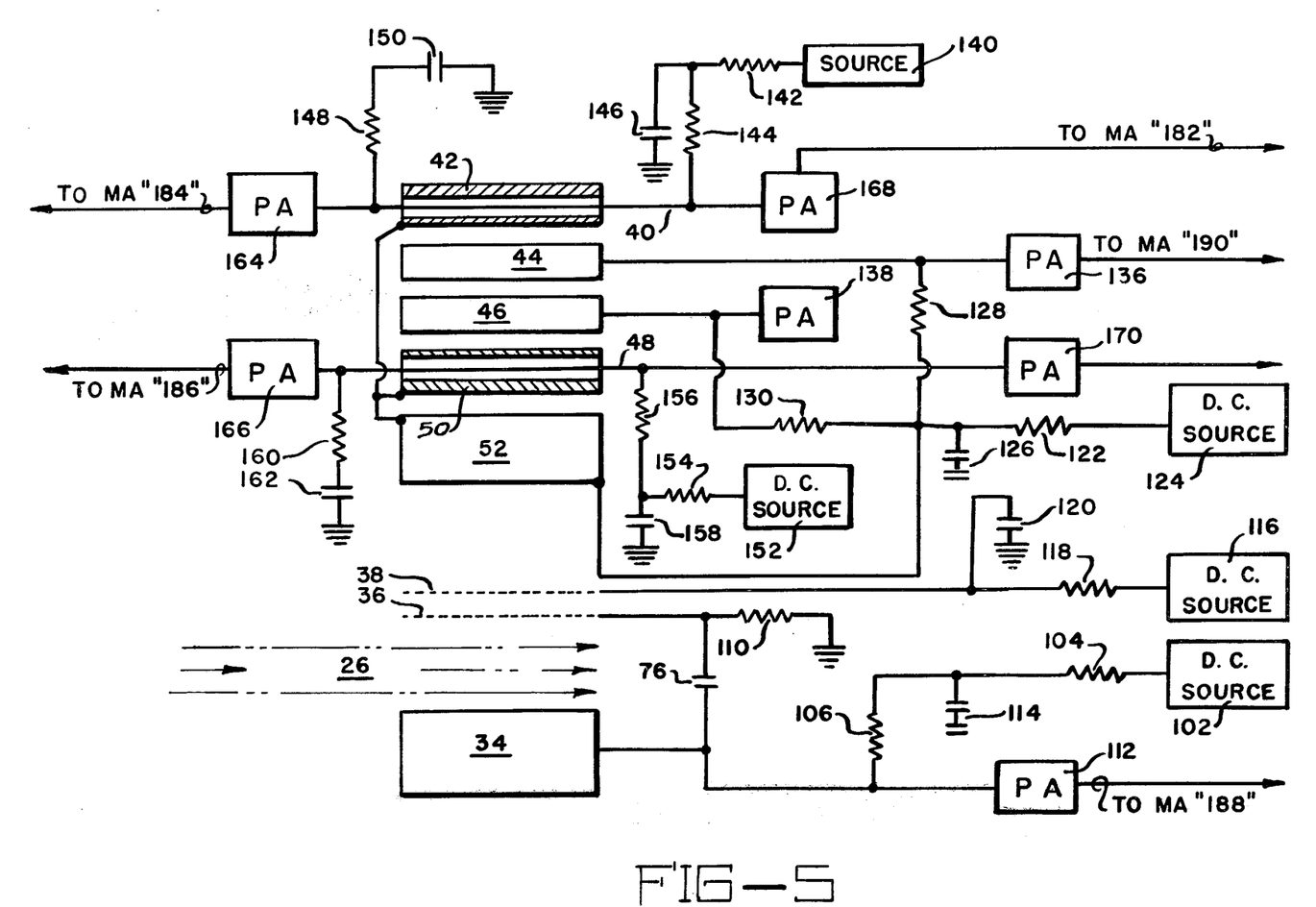
FIG. 5 is a developed schematic diagram of the detector and the electrical connections to its elements.

FIG. 5 is a schematic diagram of the detector of the present invention with an indication of the electrical connections to the various elements. In FIG. 5, the elements of FIG. 2 appear in developed form to facilitate a showing of the electrical connections. Thus, stream 26 of ions enters from the left between cathode 34 and grid 36. However, shields 42 and 50, position wires 40 and 48, collectors 44 and 46, and field shaper 52 are shown in position as though they were folded up to preserve the left-to-right orientation of FIGS. 3 and 4. The reason for this will become apparent as the description proceeds.

Inspection of FIG. 5 shows that each of the electrical elements except first grid 36 is at a d-c potential different from ground, while some of the elements are at a-c ground. First grid 36 could also be operated at a d-c potential different from ground, but ground is a convenient value for it. Source 102 is connected through resistor 104 and resistor 106 to cathode 34 to place cathode 34 at a d-c voltage of −600 V. Grid 36 is connected through capacitor 76 to cathode 34 and through resistor 110 to ground. Thus grid 36 will be at d-c ground but at the same a-c potential as cathode 34 so that pulses picked up on grid 36 and cathode 34 are coupled to preamplifier 112 to generate an output signal proportional to the total energy of an incident particle. This follows since the number of ions and free electrons generated by collision is a function of the particle energy, if other parameters are held constant, and the charge collected by the cathode 34 and grid 36 is a measure of the electrons freed by collision. Thus the combination of first grid 36 and cathode 34 with a gas between them comprises a drift chamber. Signals from grid 36 and cathode 34 may be separated by removing capacitor 76 to obtain a measure of the vertical position of the incident particle. Source 102 will maintain cathode 34 at a d-c potential of −600 V to generate the proper d-c accelerating fields between first grid 36 and cathode 34. Capacitor 114 and resistor 104 keep noise from preamplifier 112. In a similar fashion, second grid 38 is maintained at a d-c voltage of 200 V by source 116 which is connected to second grid 38 through resistor 118. Capacitor 120 maintains second grid 38 at a-c ground. The same is true with first shield 42, second shield 50 and field shaper 52 which are connected together through resistor 122 to source 124 to maintain those elements at 500 V d-c, while capacitor 126 maintains these elements at a-c ground. However, the voltage from source 124 is coupled through resistor 122 to first collector 44 and second collector 46 through resistors 128 and 130, respectively, placing first collector 44 and second collector 46 at 500 V d-c. Neither of these elements, however, is at a-c ground and the a-c signals detected by first collector 44 are amplified in preamplifier 136 to produce a first energy-change signal. The signals at collectors 44 and 46 are produced by electrons freed by collisions in those parts of the beams that are under the respective collectors. The collisions slow the ionizing particles, and the extent of this slowing is detectable at collectors 44 and 46 to provide measures of the energy losses due to collisions below each of the collectors. Thus the combination of cathode 34 and first grid 36, and either first collector 44 or second collector 46 comprises a gridded ionization chamber. It is not necessary to use both collectors; one would suffice. Signals may be used from both to provide more information, or the two collectors may be connected electrically to form a single collector for an energy-loss measurement. The a-c signal received by second collector 46 is amplified in preamplifier 138 to produce a second energy-change signal. First position wire 40 is maintained at a d-c voltage of 1600 V applied from source 140 through resistors 142 and 144 with capacitor 146 bypassing noise from source 140 or its leads. First position wire 48 is given a symmetrical connection for a-c purposes with a resistor 148 in series with capacitor 150 at the opposite end. A comparable arrangement supplies 1600 volts from source 152 through resistors 154 and 156 to second position wire 48 with capacitor 158 bypassing noise from source 152 or its leads. A comparably symmetric arrangement at the other end of wire 48 establishes a connection through resistor 160 and capacitor 162 to ground to make the two ends of the wire symmetric for a-c purposes. Both first position wire 40 and second position wire 48 generate pulses in response to attracted electrons that begin at the time the electrons reach the wires. Each such pulse is propagated in both directions along each of the wires and comparisons of the rise times of the leading edges of the pulses at opposite ends of each wire provide information about the position along the wire from left to right at which the pulse was detected. The combination of first position wire 40, first shield grid 41, and first shield 42 comprises a resistive-wire proportional counter, as does the combination of second position wire 48, second shield grid 49, and second shield 50. Each such proportional counter is position-sensitive when measurements are compared of the times that pulses reach the opposite ends of each wire. Thus preamplifier 164, which is connected to the same end of first position wire 40 as preamplifier 166 to second position wire 48, is located so that both preamplifier 164 and preamplifier 166 produce signals that are associated with high-energy ions (those deflected less by the magnetic field of the spectrograph). This is in contrast to preamplifiers 168 and 170 which are connected at the other ends of first position wire 40 and second position wire 48, respectively, which produce signals sooner from low-energy ions incident upon the detector. An illustration may clarify this. Imagine an ion incident upon the detector along a path from the spectrograph that causes it to pass under first position wire 40 midway along the length of wire 40. A pulse will be generated in first position wire 40 and will propagate with equal speed toward the two ends of the wire so that preamplifiers 164 and 168 will produce outputs that have equal rise times. Suppose now that an ion of higher energy is incident upon the detector. Because of the properties of the spectrograph, that ion will be displaced to pass under wire 40 at a location that is closer to preamplifier 164 than to preamplifier 168. The signal from preamplifier 164 will have a shorter rise time than the signal from preamplifier 168 and the difference in rise times can be processed to identify the energy of the particle. The processing of these signals as well as the total energy signal that is coupled from first grid 36 and cathode 34 through preamplifier 168 permits the recovery of information about particles entering the detector in a way that will be described below. It should be noted that it is not necessary to combine the pulse signals from first grid 36 and cathode 34 before they are applied to preamplifier 168. An alternative method of operation would be to couple the a-c signal from first grid 36 to its own preamplifier, which is not shown in FIG. 3, and to combine the signals at a later point. This is the choice of the designer. Other operating conditions might make it desirable to obtain separate measures of the two signals.

Table I is a list of the values of components in FIG. 5 for a particular embodiment of the detector that has been built and used at the Argonne National Laboratory. These values should be taken as illustrative of a particular embodiment and of the design principles involved rather than limiting. Thus, while the choice of 10 Megohms and 0.05 microfarads provided an adequate time constant for the detector that was built, another designer might use other values, or another set of beam characteristics might call for different values.

TABLE I

| Dwg No. | Type | Value or Description |
| --- | --- | --- |
| 102 | d-c source | −600 V |
| 104 | resistor | 10 Megohms |
| 106 | resistor | 100 Megohms |
| 76 | capacitor | 0.005 microfarads |
| 110 | resistor | 100 Megohms |
| 112 | preamplifier | voltage-sensitive |
| 114 | capacitor | 0.05 microfarads |
| 116 | d-c source | 200 V |
| 118 | resistor | 10 Megohms |
| 120 | capacitor | 0.05 microfarads |
| 122 | resistor | 10 Megohms |
| 124 | d-c source | 500 V |
| 126 | capacitor | 0.05 microfarads |
| 128 | resistor | 100 Megohms |
| 130 | resistor | 100 Megohms |
| 136 | preamplifier | charge-sensitive |
| 138 | preamplifier | charge-sensitive |
| 140 | d-c source | 1600 V |
| 142 | resistor | 10 Megohms |
| 144 | resistor | 200 Megohms |
| 146 | capacitor | 820 picofarads |
| 148 | resistor | 200 Megohms |
| 150 | capacitor | 820 picofarads |
| 152 | d-c source | 1600 V |
| 154 | resistor | 10 Megohms |
| 156 | resistor | 200 Megohms |
| 158 | capacitor | 820 picofarads |
| 160 | resistor | 200 Megohms |
| 162 | capacitor | 820 picofarads |
| 164 | preamplifier | voltage-sensitive |
| 166 | " | " |
| 168 | " | " |
| 170 | " | " |

Figure 6:
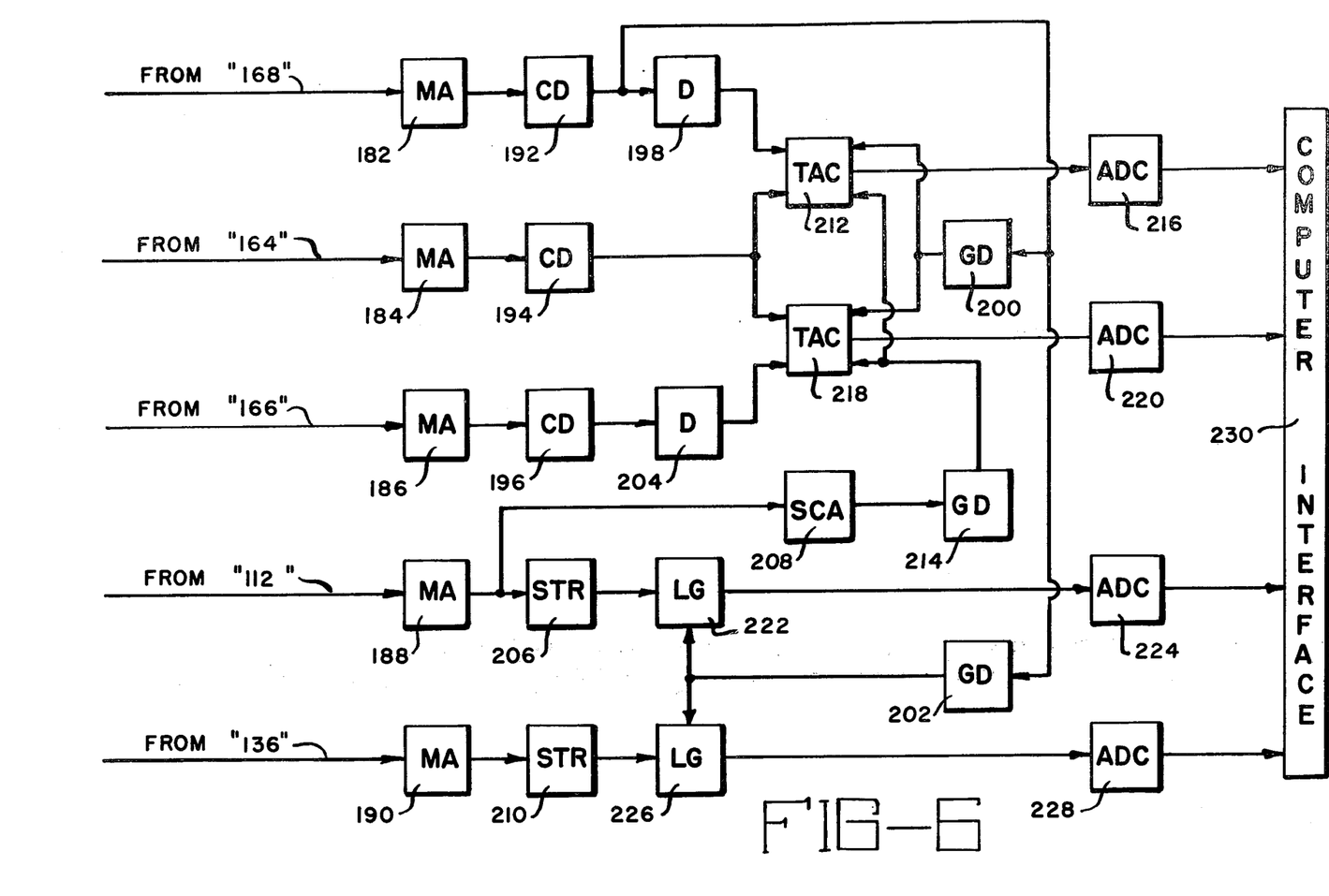
FIG. 6 is a block diagram of an electronic system for operation of the detector.

A particular embodiment that has been used to process signals from the detector is shown in FIG. 6 which is a block diagram of the electronics. The blocks of FIG. 6 are identified separately in Table II.

TABLE II

Explanation of Symbols in FIG. 6

| Symbol | Description |
| --- | --- |
| MA | main amplifier |
| CD | crossover detector |
| D | fixed delay |
| GD | gate and delay generator |
| STR | stretcher |
| SCA | single-channel analyzer |
| TAC | time-to-amplitude converter |
| ADC | analog-to-digital converter |
| LG | linear gate |

The circuit of FIG. 6 has five inputs, one from preamplifier 168 corresponding to the position signal from the low-energy end of first position wire 40, one from preamplifier 164 corresponding to a position signal from the high-energy end of first position wire 40, one from preamplifier 166 corresponding to a signal from the high-energy end of second position wire 48, one from preamplifier 112 corresponding to a total energy signal and one from preamplifier 136 corresponding to a signal denoting the rate of energy loss upon collision. It can be seen from an inspection of FIG. 5 that preamplifiers 138 and 170 produce signals that are not used in FIG. 6. Other applications might make it desirable to use some of these unused signals for cross-checking coincidence or improving the statistics of measurements. The signals in FIG. 6 are applied individually to main amplifiers 182, 184, 186, 188, and 190, and the outputs of main amplifiers 182, 184, and 186 are applied to crossover detectors 192, 194, and 196, respectively. The output of crossover detector 192 is applied to fixed delay 198 and gate and delay generators 200 and 202. The output of crossover detector 196 is applied to fixed delay 204. The output of main amplifier 188 is applied to stretcher 206 and single-channel analyzer 208. The output of main amplifier 190 is applied to stretcher 210. The output of crossover detector 194 is applied as a start signal to time-to-amplitude converter 212 and the output of fixed delay 198 is applied to stop time-to-amplitude converter 212. A gating signal for time-to-amplitude converter 212 is obtained by applying the output of single-channel analyzer 208 to gate and delay generator 214, the output of which is a gate signal to time-to-amplitude converter 212. A strobe signal for time-to-amplitude converter 212 is obtained as the output of gate and delay generator 200. The result is an analog signal corresponding in amplitude to the position of an individual particle and the analog signal is applied to analog-to-digital converter 216. A comparable calculation is performed in time-to-amplitude converter 218 which is started by the output of fixed delay 204, stopped by the output of crossover detector 194, gated by the output of gate and delay generator 214 and strobed by the output of gate and delay generator 200. The output of time-to-amplitude converter 218 is applied to analog-to-digital converter 220 to provide a measure of the angle of entry of the particle being measured.

Energy measurements are made as follows. The output of stretcher 206 is applied as an input to linear gate 222 which is controlled by the output of gate and delay 202. The output of linear gate 222 is applied to analog-to-digital converter 224 and is a signal analogous to the total energy of the particle being investigated. The output of stretcher 210 is applied to linear gate 226 which is controlled by the output of gate and delay generator 202. The output of linear gate 226 is applied to analog-to-digital converter 228 and is a signal proportional to the energy change experienced by the particle in traversing a known distance through the gas in the detector. All of the digital outputs of analog-to-digital converters 216, 220, 224, and 228 are applied for processing to computer interface 230 where various calculations can be made as desired. Computer interface 230 includes the necessary programs and hardware to calculate and display the result.

Figure 7:
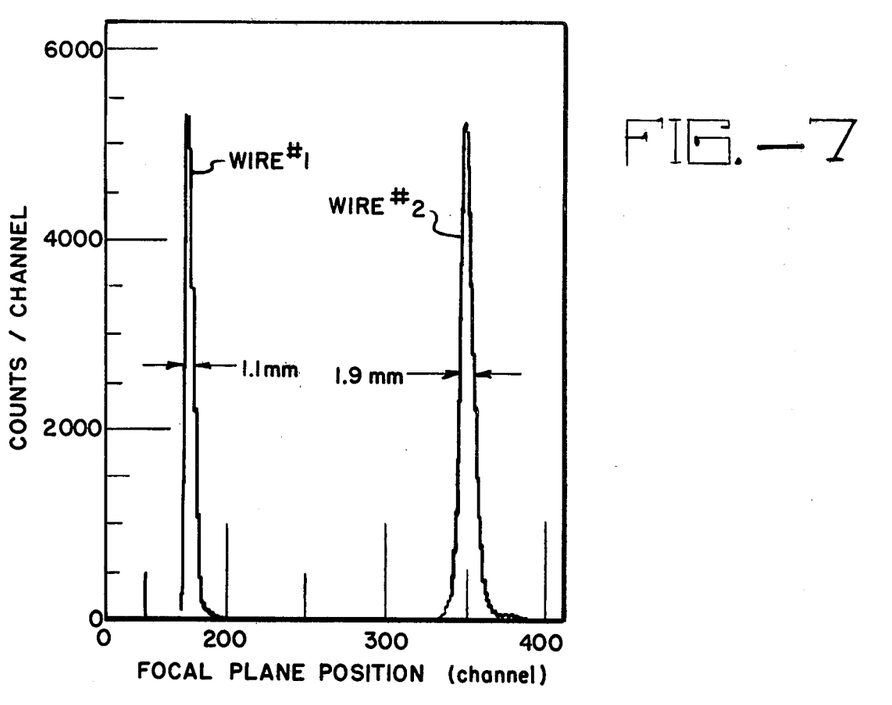
FIG. 7 is a typical position spectrum obtained with the detector.

FIGS. 7-13 show a number of curves of different kinds obtained with a detector according to the present invention connected to the magnetic spectrograph at the Argonne National Laboratory. FIG. 7 is a plot of counts per channel as a function of focal-plane position that comprises a position spectrum for a well-focused beam of oxygen ions at 56 MeV. The curve on the left represents counts from one end of position wire 40 of FIG. 2 and the curve on the right represents counts from one end of position wire 48 of FIG. 2. In FIG. 7, the resolution of the spectrum obtained on wire 1 at full width half maximum (FWHM) is 1.1 mm while that from wire 2 is 1.9 mm. The increased width is due to multiple scattering in the gas in the detector which was isobutane at a pressure of the order of 100 Torr ($1.3 \times 10^4$ Pa). The position spectrum of a beam of particles such as that of FIG. 7 can be used to determine the deflection of ions in the median plane of the magnetic spectrograph and hence to determine the momentum of an ion.

Figure 8:
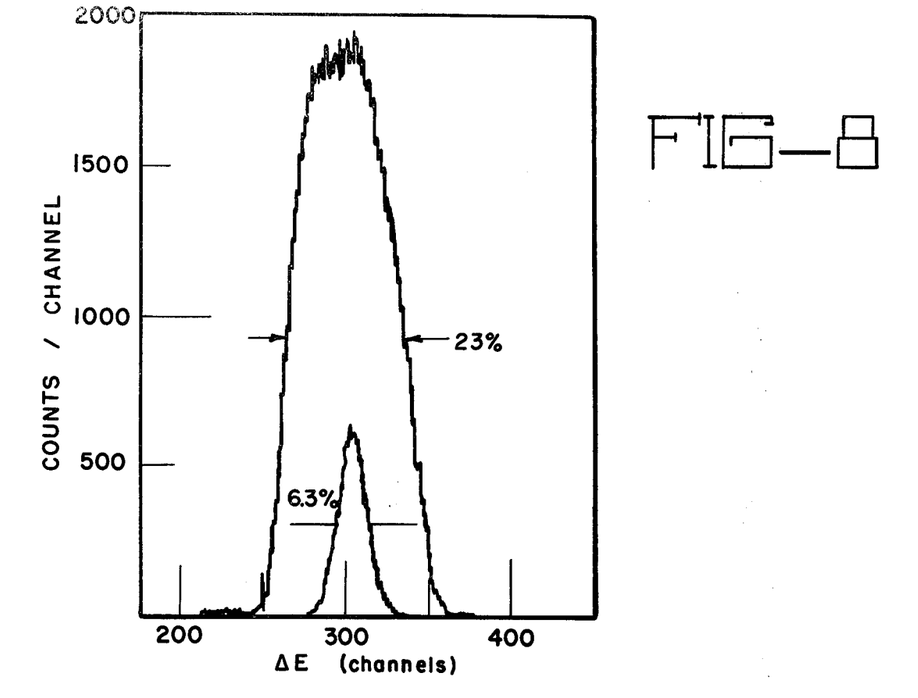
FIG. 8 is a typical energy-change spectrum obtained with the detector.

FIG. 8 is a plot of a typical spectrum of the rate of loss of energy. The curves shown in FIG. 8 are plots of counts per channel as a function of energy change measured in the conventional way in channels of a multichannel analyzer for oxygen ions at 56 MeV. The smaller curve in FIG. 8 represents a spectrum of particles from the magnetic spectrograph arriving in a single angle. The larger curve is an energy-change spectrum obtained over all angles of particles incident upon the detector from the magnetic spectrograph. These curves provide a measure of the energy loss of a particle upon collision with gas in the detector and is thus a measure of the energy spread in the stream of particles. The energy loss thus observed is a function of the core charge of the ions that form the beam, or, in other words, the number of protons in the nucleus.

Figure 9:
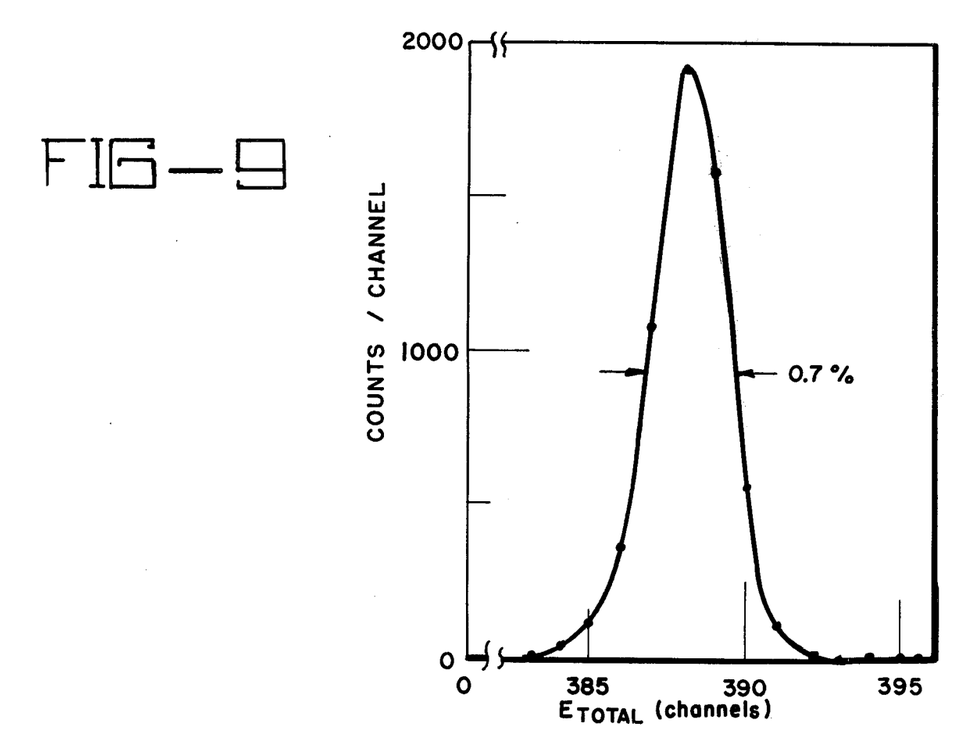
FIG. 9 is a typical total-energy spectrum obtained with the detector.

A different bit of information about a particle beam is obtained from the curve of FIG. 9 which is a plot of counts per channel as a function of the channels that represent the total energy of the particles in a beam of oxygen ions at 56 MeV. This is a measure of the total energy of the typical particle and the curve in FIG. 9 has an FWHM value of 0.7%, a high value of resolution.

Figure 10:
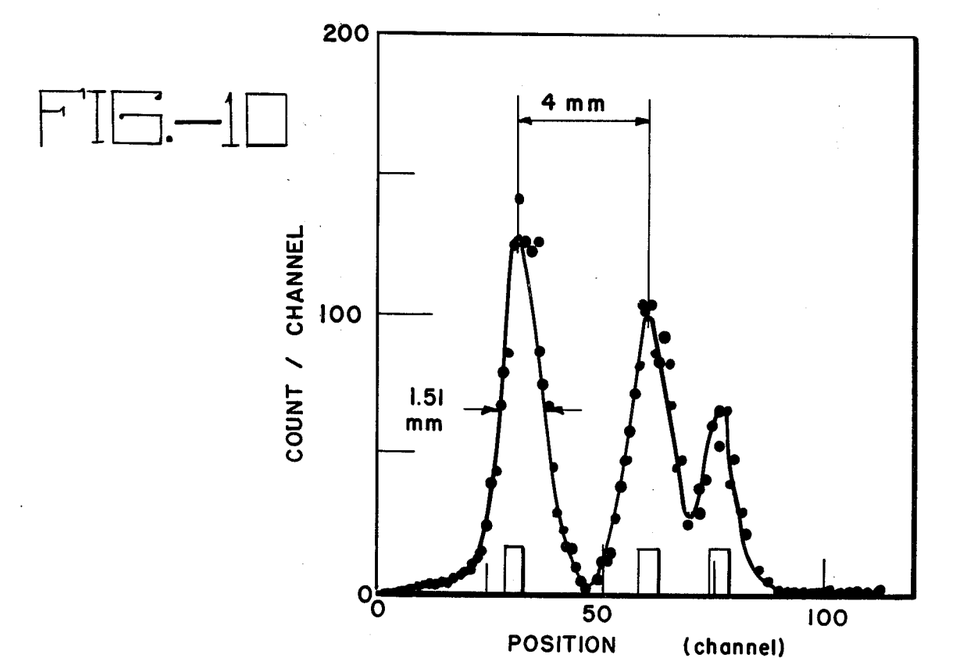
FIG. 10 is a typical vertical position spectrum obtained with the detector.

FIG. 10 is a spectrum made to illustrate the vertical resolution that can be obtained with the information available from the detector. In FIG. 10, the counts per channel are plotted as a function of vertical position for a beam that is blocked in the opening of the detector except for three horizontal slit openings that are approximately 0.5 mm wide. This curve was obtained by disconnecting capacitor 76 and analyzing separately the signals from cathode 34 and grid 36. The spectra are seen to indicate peak values at the locations of the slits, FWHM values approximately three times the slit widths, and the two slits to the right are seen to be resolved as two openings with the proper separation.

Figure 11:
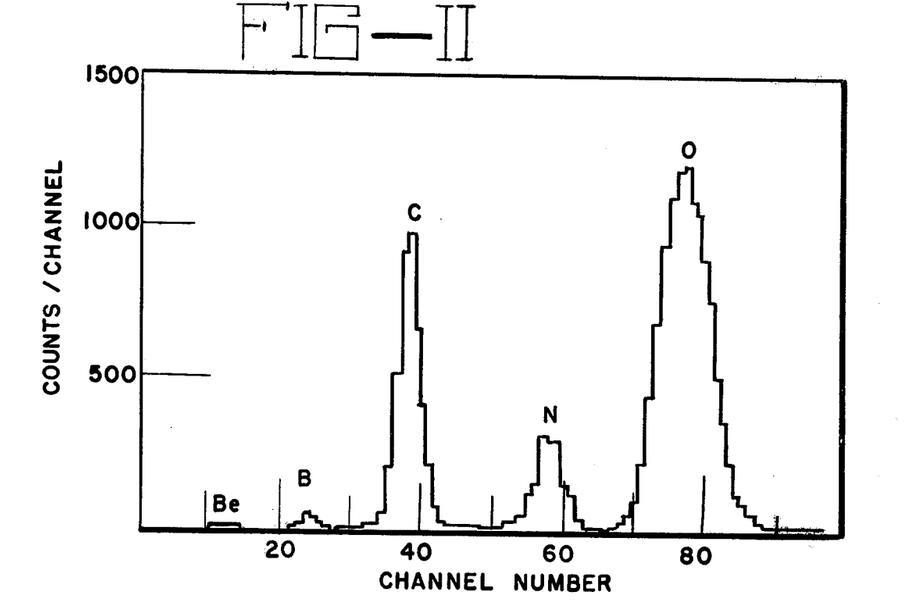
FIG. 11 is an energy-energy change product spectrum obtained with the detector.

The preceding curves have been obtained on beams whose properties were well known and were obtained and shown to illustrate features of the detector. FIG. 11 is a spectrum of the type for which the detector was designed. It is a product spectrum: that is to say, the spectrum of the product of energy times energy change which is approximately proportional to the product of mass and the square of the atomic number. Such information allows the unambiguous identification of an isotope as indicated in FIG. 11 in which the curves from left to right identify, respectively, the presence of beryllium, boron, carbon, nitrogen and oxygen ions in a beam from the magnetic spectrograph.

Figure 12:
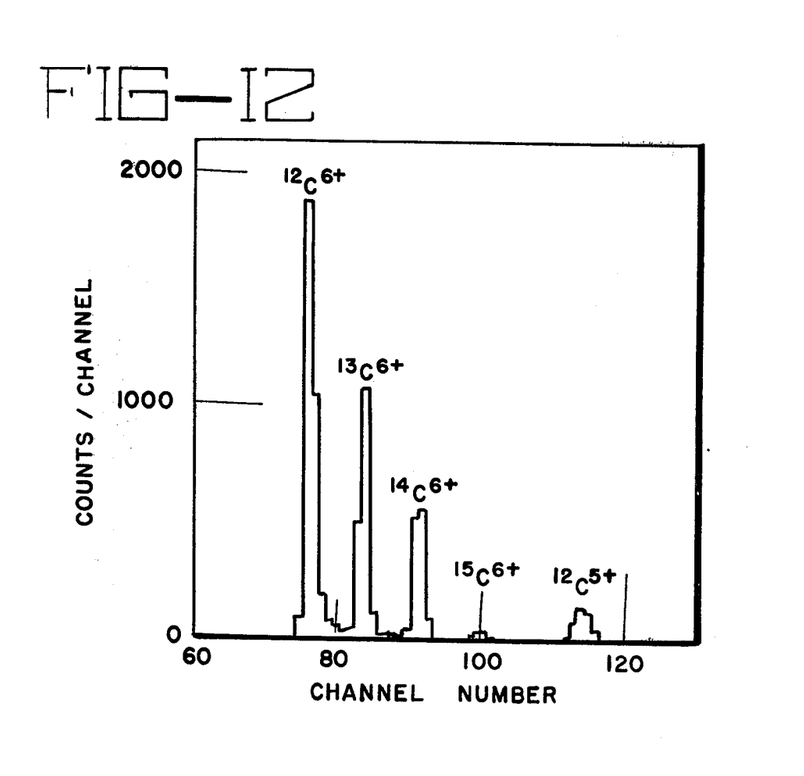
FIG. 12 is a spectrum of mass divided by the square of charged obtained with the detector.

Another of the useful results obtainable from the detector is shown in FIG. 12 which is a spectrum of mass divided by the square of the number of the charge state. This is useful because, when applied to the information obtained as in FIG. 11 to the product spectrum, it is possible to divide and obtain a unique identification of the ion and its state of ionization. The spectra in FIG. 12 indicate peaks that from left to right represent $^{12}C$ in the plus six ionization state, $^{13}C$ in the plus six ionization state, $^{14}C$ in the plus six ionization state, a small peak at channel 100 that is believed to be $^{15}C$ in the plus six ionization state, and finally $^{12}C$ in the plus five ionization state.

Figure 13:
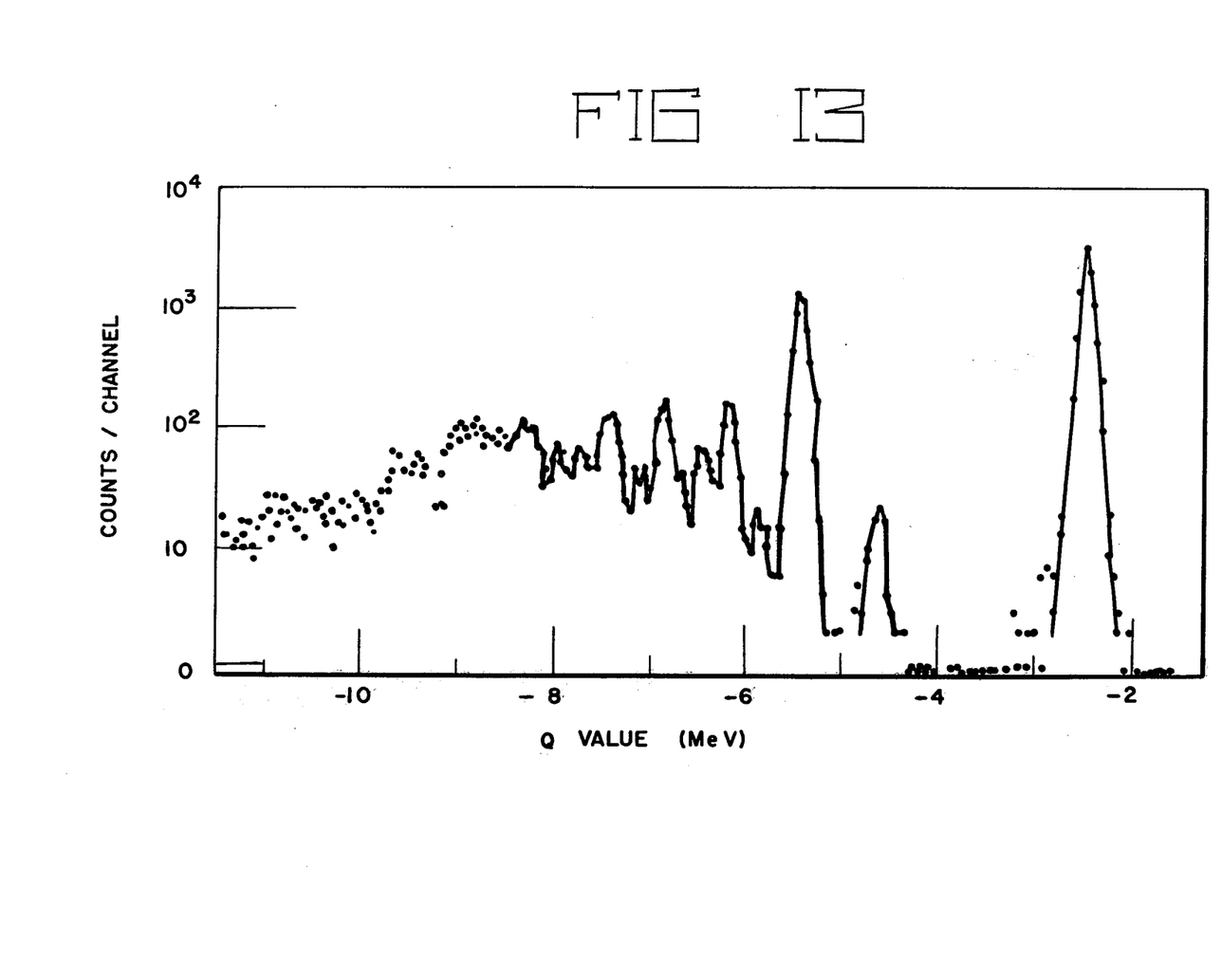
FIG. 13 is a typical spectrum obtained using the detector.

FIG. 13 is a spectrum obtained by directing a beam of atoms of oxygen ($^{16}O$) at a target of calcium ($^{48}Ca$). The reaction between beam and target produced atoms of nitrogen ($^{15}N$), the atom of interest in this spectrum, and also scandium ($^{49}Sc$). The spectrum in FIG. 13 is a plot of counts per channel on a logarithmic scale as a function of the Q value in MeV. This spectrum displays a resolution and separation from unwanted ions that has been unattainable with detectors that have previously been built.

The embodiments of the invention in which an exclusive property or privilege is claimed are defined as follows:

1. An apparatus for generating electrical signals descriptive of properties of a moving charged particle and of the path of the moving charged particle comprising in combination:
   a griddled ionization chamber disposed in the path of the charged particle, the chamber containing a gas of a known composition at a controlled pressure, the chamber generating a first electrical signal substantially proportional to the total kinetic energy of the moving charged particle and generating a stream of electrons along the path;
   a plurality of resistive wire proportional counters responsive to electrons in the stream of electrons to generate a plurality of electrical signals to identify the location of the path;
   a drift chamber responsive to electrons in the stream to generate a second electrical signal responsive to the rate of loss of energy of the moving charged particle upon collision with molecules of the gas;
   an enclosure containing the ionization chamber, the proportional counter, the drift chamber, and the gas, the enclosure including a window to admit the moving charged particle while containing the gas; and
   means connected to the enclosure for supplying the gas at a controlled pressure.

2. The apparatus of claim 1 including in addition a plurality of electrical conductors disposed and connected electrically to generate electric fields normal to the path of the particle.

3. The apparatus of claim 2 wherein the gridded ionization chamber comprises:
   a cathode disposed parallel to the path of the charged particle on a first side of the path; and
   a wire grid disposed parallel to the path of the charged particle on a second side opposite to the first side.

4. The apparatus of claim 2 wherein the plurality of resistive-wire proportional counters comprises:
   a plurality of position wires, each disposed parallel to each other and in a plane parallel to the path; and
   a plurality of gridded shields, one of each of the plurality surrounding one of each of the position wires, a grid of each of the gridded shields oriented toward the path of the charged particles.

5. The apparatus of claim 2 wherein the drift chamber comprises:
   a cathode disposed parallel to the path of the charged particle on a first side of the path; and
   a collector disposed parallel to the path on a second side opposite to the first side.

6. An apparatus for detecting and displaying characteristics of moving charged particles in a vacuum region at the focal surface of a magnetic spectrograph, the particles moving in paths that are substantially planar, the apparatus comprising:
   a vacuum-tight enclosure for placement in the vacuum region;
   means connected to the enclosure for placing in the enclosure a gas of a known composition at a known pressure;

a window in the enclosure placed to admit the moving particles into the enclosure, the window resisting leakage of the gas into the vacuum region;

a guard electrode disposed in the vacuum region parallel to the paths near the window;

a planar cathode in the enclosure disposed parallel to the paths of the particles and on a first side of the paths;

a first grid of fine wire in the enclosure disposed parallel to the paths of the particles and on a second side of the paths opposite to the first side;

a second grid of fine wire in the enclosure disposed parallel to the first grid and farther from the paths than the first grid;

a split anode in the enclosure disposed substantially parallel to the second grid and farther from the paths than the first grid, the split anode comprising a coplanar array of a first gridded shield enclosing a first position wire, a first collector, a second collector, a second gridded shield enclosing a second position wire, and a shaper electrode;

means connected to the guard electrode, the cathode, the first grid, the second grid, the first shield, the first position wire, the first collector, the second collector, the second shield, the second position wire for supplying operating electrical voltages thereto;

signal-processing means connected electrically to the cathode, the first grid, the first position wire, the first collector, the second collector, and the second position wire to receive and process signals generated therein by the passage of charged particles; and computing means for identifying and displaying characteristics of the charged particles.

7. An apparatus for generating electrical signals descriptive of properties of a moving charged particle and of the path of the moving charged particle comprising in combination:

a gas of a known composition at a controlled pressure disposed in the path of the moving charged particle and responsive to the moving charged particle to generate electrons and ions by collision with the charged particle;

means for measuring the rate of loss of energy of the moving charged particle in traversing the gas including a cathode disposed parallel to the path of the charged particle on a first side of the path and a collector electrode disposed parallel to the path on a second side opposite to the first side;

means for measuring the total energy of the moving charged particle including a cathode disposed parallel to the path of the charged particle on a first side of the path and a wire grid disposed parallel to the path of the charged particle on a second side opposite to the first side; and means for measuring the location of the path of the moving charged particle including a pair of resistive-wire proportional counters responsive to electrons generated by collision of the moving charged particle with molecules of the gas to generate a plurality of electrical signals to identify the location of the path.

* * * * *